US009493247B2

(12) United States Patent
Reye et al.

(10) Patent No.: US 9,493,247 B2
(45) Date of Patent: Nov. 15, 2016

(54) COMPONENT ARRANGEMENT ON AN AIRCRAFT STRUCTURE, AND A METHOD FOR THE INSTALLATION OF A COMPONENT INTO AN AIRCRAFT STRUCTURE (75) Inventors: Volker Reye, Moisburg (DE); Stefan Tacke, Moisburg (DE); Cyrille Billard, Orvault (FR); Kai Streit, Neu Wulmstorf (DE)

(73) Assignee: Airbus Operations GmbH, Hamburg (DE)

( * ) Notice: Subject to any disclaimer, the term of this patent is extended or adjusted under 35 U.S.C. 154(b) by 51 days.

(21) Appl. No.: 14/003,004

(22) PCT Filed: Feb. 29, 2012

(86) PCT No.: PCT/EP2012/053453
§ 371 (c)(1),
(2), (4) Date: Nov. 11, 2013

(87) PCT Pub. No.: WO2012/119906
PCT Pub. Date: Sep. 13, 2012

(65) Prior Publication Data
US 2015/0034782 A1 Feb. 5, 2015

Related U.S. Application Data (60) Provisional application No. 61/451,138, filed on Mar. 10, 2011.

(30) Foreign Application Priority Data

Mar. 10, 2011 (DE) ........................ 10 2011 005 355

(51) Int. Cl.
*B64C 1/14* (2006.01)
*B64D 43/00* (2006.01)
*B64D 43/02* (2006.01)

(52) U.S. Cl.
CPC ............... *B64D 43/00* (2013.01); *B64D 43/02* (2013.01); *Y10T 29/49826* (2015.01)

(58) Field of Classification Search
CPC ...... B64D 43/02; B64D 45/02; G01P 13/025
USPC ....................................... 244/129.4
See application file for complete search history.

(56) References Cited

U.S. PATENT DOCUMENTS 2,316,507 A * 4/1943 Dykeman ..................... 220/302
3,108,473 A * 10/1963 Serra et al. ................. 73/170.01
(Continued)

FOREIGN PATENT DOCUMENTS

DE 19923087 12/2000
EP 1145952 10/2001
(Continued)

OTHER PUBLICATIONS

International Preliminary Report on Patentability, Sep. 10, 2013.
(Continued)

*Primary Examiner* — Bradley Duckworth
(74) *Attorney, Agent, or Firm* — Greer, Burns & Crain Ltd.

(57) ABSTRACT

A component arrangement on an aircraft structure, in particular on a fuselage structure of an aircraft, with at least one mounting structure connected with the aircraft structure, and at least one component to be assigned to the aircraft structure, in particular a measuring device. At least one component carrier is provided to receive the component to be mounted, wherein the component carrier is connected with the mounting structure, and an outer surface of the component carrier, facing away from the component, extends approximately flush with an outer surface of the aircraft structure. Also a method for the installation of a component into an aircraft structure with a mounting structure including the step of connecting the component with the mounting structure via a component carrier, so that an outer surface of the component carrier, facing away from the component, extends approximately flush with an outer surface of the aircraft structure.

17 Claims, 6 Drawing Sheets (56) References Cited

U.S. PATENT DOCUMENTS

| | | | |
|---|---|---|---|
| 3,882,721 A * | 5/1975 | Neary et al. | 73/170.02 |
| 5,616,861 A | 4/1997 | Hagen | |
| 6,443,390 B2 * | 9/2002 | Bourgon et al. | 244/1 R |
| 6,672,152 B2 * | 1/2004 | Rouse et al. | 73/170.02 |
| 6,752,020 B1 | 6/2004 | Sobotta et al. | |
| 7,350,752 B2 * | 4/2008 | Paradis et al. | 244/129.1 |
| 7,407,136 B2 | 8/2008 | Murg | |
| 8,662,451 B2 * | 3/2014 | Delgado Jareno al. | 244/129.4 |
| 2001/0030261 A1 * | 10/2001 | Bourgon et al. | 244/119 |
| 2003/0115948 A1 | 6/2003 | Rouse et al. | |
| 2004/0261518 A1 * | 12/2004 | Seidel et al. | 73/182 |
| 2009/0166473 A1 * | 7/2009 | Zuniga Sagredo | 244/129.4 |
| 2011/0141645 A1 * | 6/2011 | Le Louarn et al. | 361/117 |
| 2012/0118075 A1 * | 5/2012 | Golly | 73/861.42 |

FOREIGN PATENT DOCUMENTS

| | | |
|---|---|---|
| WO | 9415832 | 7/1994 |
| WO | 03058257 | 7/2003 |
| WO | 2009153452 | 12/2009 |

OTHER PUBLICATIONS

German Office Action, Jul. 20, 2011.
Chinese Office Action, Jun. 5, 2014.

* cited by examiner

COMPONENT ARRANGEMENT ON AN AIRCRAFT STRUCTURE, AND A METHOD FOR THE INSTALLATION OF A COMPONENT INTO AN AIRCRAFT STRUCTURE

CROSS-REFERENCES TO RELATED APPLICATIONS

This application claims the benefit of the U.S. Provisional Application No. 61/451,138, filed on Mar. 10, 2011, and of the German patent application No. 10 2011 005 355.7 filed on Mar. 10, 2011, the entire disclosures of which are incorporated herein by way of reference.

BACKGROUND OF THE INVENTION

The invention concerns a component arrangement on an aircraft structure, in particular on a fuselage structure of an aircraft, and also a method for the installation of a component into an aircraft structure.

The integration of components, in particular of aerodynamic sensors, such as, for example, static pressure load cells and similar in aircraft structures is subject to many limitations, since a very wide variety of requirements for the components and the primary structure of the aircraft must be taken into account. For example, high requirements are placed on the continuity of the aerodynamic surface, and the pressure sealing integrity of a fuselage structure of an aircraft. To these are added special systems requirements, such as, for example, for the heating of sensors. Production tolerances for the various components work against the requirement for an optimal aerodynamical surface. In the case of aircraft made of fibre-reinforced composite structures in particular the high tolerances on the thickness of the components play a decisive role. In complex and sensitive systems thickness tolerances that are too high can cause significant functional problems, such as, for example, large measurement errors, which, especially in the case of aerodynamic measuring devices, can lead to problems in the operation of the aircraft.

From the document EP 1 145 952 A1, for example, a component arrangement on a fuselage structure of an aircraft is of known art; this uses a mounting structure, connected with the aircraft structure, for a static pressure load cell to be assigned to the aircraft structure, a so-called integrated static probe (ISP). What is disadvantageous in such component arrangements on aircraft structures is that the accumulation of component tolerances can lead to an insufficient pressure sealing integrity of the pressure load cell installation. Also disadvantageous is the fact that a thermally effective seal, arranged between the pressure load cell and an aerodynamic plate, can be damaged as a result of a sequence of high tolerances on the individual components, or as a result of gaps that are too large causes a malfunction as a result of insufficient contact.

SUMMARY OF THE INVENTION

In contrast, the object underlying the invention is the creation of a component arrangement on an aircraft structure, and a method for the installation of a component into an aircraft structure, in which the resulting arrangement satisfies the highest requirements on operational reliability, function and aerodynamics.

An inventive component arrangement on an aircraft structure, in particular on a fuselage structure or wing structure of an aircraft, uses at least one mounting structure connected with the aircraft structure for at least one of the components to be assigned to the aircraft structure, in particular a measuring device. In accordance with the invention furthermore at least one component carrier is provided for the reception of the component to be mounted, wherein the component carrier can be connected with the mounting structure, and an outer surface of the component carrier, facing away from the component, extends approximately flush with an outer surface of the aircraft structure. The component carrier is preferably designed as an aerodynamic plate, wherein the installation of the component, for example, a static pressure load cell, takes place directly on the aerodynamic plate. By this means the tolerance between component and aerodynamic plate is only dependent on these two component tolerances. Also advantageous is the reduction of the number of components required, which, in addition to a weight reduction of the total system, enables a cost reduction. In addition to the fuselage structure, the component arrangement can also advantageously be arranged on other structural regions of an aircraft, in particular on the wing.

In accordance with a particularly preferred example of embodiment of the invention the mounting structure is connected with an inner surface of the aircraft structure. The mounting structure is preferably connected with the aircraft structure such that a seating face for the component carrier has a defined, approximately even clearance from the outer surface of the aircraft structure.

The mounting structure, designed, for example, as a doubler, is preferably mounted, and/or shimmed, on the aircraft outer skin from the interior with defined gaps. Here the seating face is preferably brought by means of a device to a defined clearance from the outer aircraft contour, and is fixed, in particular riveted, with a solid and/or fluid adjustment element (shim) at a permanently defined clearance from the structure. In addition to acting as a mounting structure, this doubler preferably also acts at the same time as a stiffening element of the primary aircraft cell. By this means a further weight reduction of the total system is made possible.

It has proved to be particularly advantageous if the component carrier has an receiving section for the reception of a projection on the component to be mounted. The receiving section can be designed to be approximately cylindrical in shape, corresponding to the projection on the component. The component is preferably connected with an inner side of the component carrier.

In one form of embodiment of the invention the receiving section of the component carrier has an abutment face facing towards the component, which can be brought into abutment against a flange face of the component. In this region the component is preferably connected with the component carrier by means of bolts. The receiving section preferably has an approximately ring-shaped mounting web.

In accordance with the invention it has proved to be advantageous if at least one seal, for example, a sealing ring, i.e. an O-ring seal, is arranged in the region of the abutment face. The receiving section preferably has a ring groove on the end face facing towards the component for the reception of the O-ring seal. By this means optimal sealing integrity is achieved between component carrier and component.

In an inventive example of embodiment in the mounted state of the component arrangement an end face of the projection on the component, via at least one thermally effective seal (thermal seal), abuts against a contact face of the component carrier. In a preferred design as metal components the component tolerances of the component carrier and the mounting structure are in a range that allows the thermal seal to function in a trouble-free manner. The latter is provided for the transfer of heat output from the static pressure load cell to the aerodynamic plate to combat icing. The thermal coupling between the component, for example, a static pressure load cell, and the component carrier, or aerodynamic plate, is here optimised such that no damage or malfunction of the thermally effective seal is to be anticipated. The system can alternatively by virtue of the optimised connection be introduced without a thermal seal.

In one specific example of embodiment of the invention the component carrier is approximately cup-shaped in design, and can be inserted into a receptacle of the approximately ring-shaped mounting structure. Assembly preferably takes place from an inner side. Here a supporting surface of the component carrier is preferably brought into abutment against a seating face of the mounting structure. The overall result is that by this means a simple assembly of the components, which have been reduced to a minimum, is achieved with excellent sealing integrity.

The component carrier, embodied as an aerodynamic plate, is preferably mounted from the interior onto the mounting structure provided as a doubler; in particular, it is bolted on. Component carrier and mounting structure can, for example, be manufactured as metal components with small component tolerances. In particular, in the case of aircraft structures made of CFC fibre-reinforced composite materials, the metal components are preferably designed from a titanium alloy. By virtue of the ability to produce metal components very precisely, small component tolerances are present, so that the aerodynamic plate can be bolted into a recess of the aircraft outer skin with minimum variances (production tolerances of the plate itself) of the outer contour of the aircraft. By this means the quality of the aerodynamic flow is only affected to the minimum possible extent. Furthermore, a replacement of the aerodynamic plate can be undertaken from the interior without much effort, while the aircraft is in service. The plate does not require adjustment, which enables an enormous time advantage in the maintenance of the part, or its replacement. The overall result is that simple maintenance of the aerodynamic plate is achieved.

The component carrier, i.e. the aerodynamic plate, is preferably designed as a structural component. By this means a weight advantage can be achieved, compared with conventional solutions, since the aerodynamic plate is no longer designed as just a flow-optimised panel, but as a load-bearing structure. The particularly preferred installation of the plate from the interior ensures that even in the event of a failure of all the bolted connections of the plate, the latter is not lost, since as a result of the internal pressure it is loaded outwards, and even in the absence of internal pressure is still held in its position by the sealing ring. It is furthermore advantageous that the aerodynamic function of the surface of the plate is fully uninterrupted by bolt heads. This enables a more exact flow measurement as a result of the completely plane surface, which also does not have any surface waviness as a result of tightening the bolts. The overall result is that an improved aerodynamic flow quality is achieved for the measurement system, with simplified assembly and a high level of operational reliability.

The component carrier preferably has an approximately L-shaped flange region, wherein a ring-shaped collar can be connected with the mounting structure. By this means a defined, form-fit seating of the component carrier on the mounting structure is achieved.

At least one seal, in particular an O-ring seal, is preferably arranged in the flange region. The seal can be assigned to an arm of the flange region. That is to say, the pressure sealing integrity between the aerodynamic plate and the doubler is preferably ensured by means of a peripheral O-ring seal in a groove of the aerodynamic plate. At the same time this enables the aerodynamic plate to be centred in the doubler. Compared with conventional solutions the laborious sealing process using a sealant, etc. can be eliminated so that assembly is further simplified.

In accordance with a preferred variant of embodiment of the invention the mounting structure has a peripheral design of stiffening rim, preferably approximately L-shaped. One arm of the stiffening rim preferably extends inwards in the direction of the inner side of the fuselage, and a second arm extends essentially parallel to the inner side of the fuselage. The stiffness of the mounting structure is thereby increased with minimal deployment of material.

The invention is particularly suitable for the assembly of a pressure measuring device, in particular a static pressure load cell, on a fuselage structure of an aircraft. The at least one component can, however, also be another form of sensor, in particular a temperature sensor, or similar.

The inventive method for the installation of a component on an aircraft structure in particular a measuring device on a fuselage structure of an aircraft, is characterised in that a mounting structure is mounted on the aircraft structure, in particular on its inner side, wherein the component is connected with the mounting structure via a component carrier, and an outer surface of the component carrier, facing away from the component, extends approximately flush with an outer surface of the aircraft structure.

Other advantageous further developments of the invention are the subject of the further subsidiary claims.

BRIEF DESCRIPTION OF THE DRAWINGS

In what follows preferred examples of embodiment of the invention are elucidated in more detail with the aid of schematic drawings. Here.

DETAILED DESCRIPTION OF THE PREFERRED EMBODIMENTS

Figure 1:
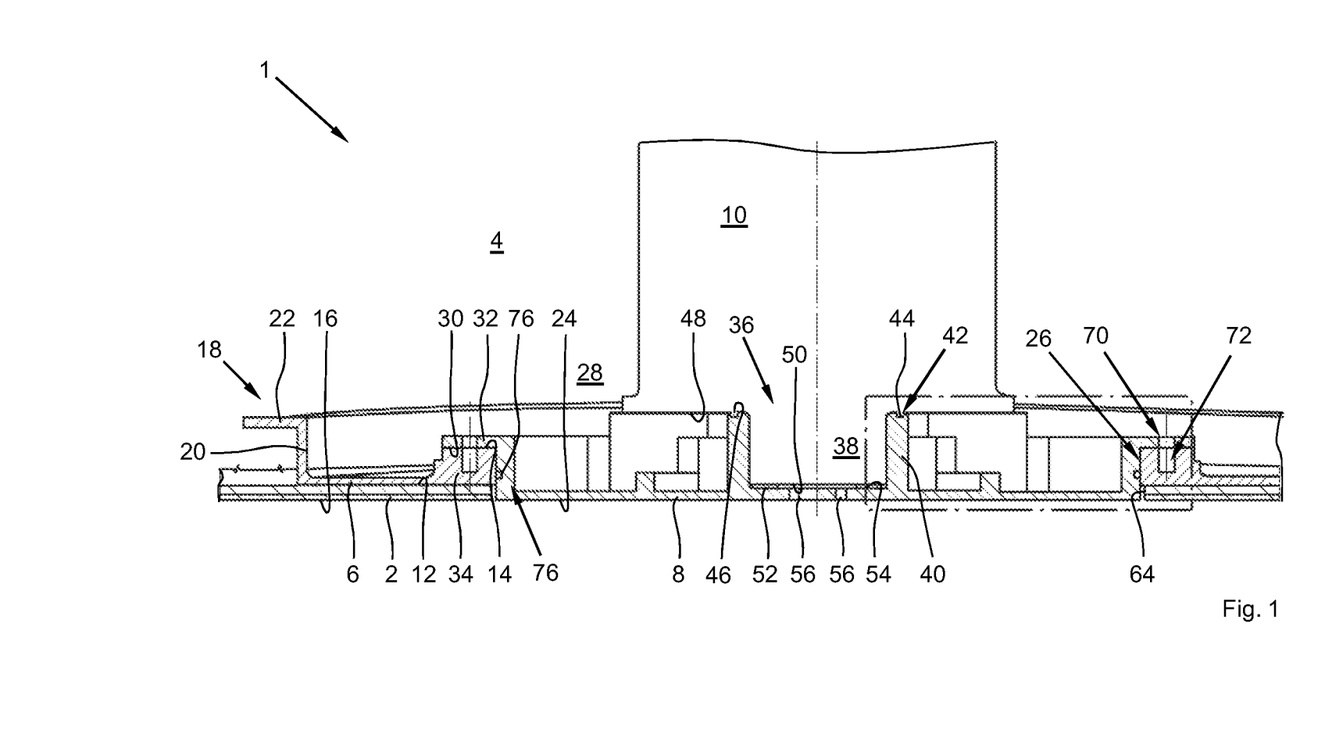
FIG. 1 shows a longitudinal section of a component arrangement on an aircraft structure, in accordance with a first inventive example of embodiment.

FIG. 1 shows a component arrangement 1 on a fuselage structure 2 of an aircraft 4 with a mounting structure 6 designed as a doubler, which mounting structure is connected with the fuselage structure 2 and with a component carrier 8 for the reception of a component 10 to be mounted. In the example of embodiment of the invention represented the component is a static pressure load cell 10, which is mounted on the fuselage structure 2 by means of the component carrier 8 and the mounting structure 6. However, the invention is not limited to the application of the installation of a static pressure load cell 10; rather the component arrangement 1 is also particularly suitable for the installation of, for example, other sensors, such as thermal sensors and similar.

The mounting structure 6 is connected with an inner surface 12 of the fuselage structure 2 such that a seating face 14 for the component carrier 8 has a defined, approximately even clearance from the outer surface 16 of the fuselage structure 2. By this means the seating face 14 is brought by means of a device to a defined clearance from the outer aircraft contour, and is riveted to the structure with a solid and/or fluid shim with a permanently defined clearance from the latter.

The mounting structure 6 has a peripheral design of stiffening rim 18, which is preferably approximately L-shaped. One arm 20 of the stiffening rim 18 hereby extends inwards in the direction of the inner side of the fuselage, and a second arm 22 extends essentially parallel to the fuselage inner surface 12.

The component carrier 8 is connected with the mounting structure 6, wherein an outer surface 24 of the component carrier 8, facing away from the static pressure load cell 10, extends in an aerodynamically optimised manner approximately flush with the outer surface 16 of the fuselage skin 2 that is made of carbon fibre-reinforced plastic. The component carrier 8 is designed as a circular aerodynamic plate, wherein the installation of the static pressure load cell 10 takes place directly on this plate structure. The component carrier 8 can be inserted into a central receptacle 26 of the round, approximately ring-shaped mounting structure 6. Assembly takes place from an inner side 28. Here a supporting surface 30 of a ring-shaped collar 32 of the component carrier 8 is brought into abutment against the seating face 14 of a flange 34 of the mounting structure 6.

The component carrier 8 has a centrally arranged receiving section 36 for the reception of an approximately cylindrically shaped projection 38 of the static pressure load cell 10. The receiving section 36 has an approximately ring-shaped mounting web 40 with an end face, ring-shaped groove 42 facing towards the pressure load cell 10 for the reception of a sealing ring 44. Corresponding to the projection 38 of the pressure load cell 10, the receiving section 36 is designed in an approximately cylindrical shape and has an abutment face 46 facing towards the pressure load cell 10 which in the assembled state is brought into abutment against a flange face 48 of the pressure load cell 10.

In the assembled state of the component arrangement 1 an end face 50 of the projection 38 of the pressure load cell 10, via a ring-shaped seal, designed as a flat seal 52 and thermally effective, abuts against a contact face 54 of the receiving section 36 of the component carrier 8. The thermal coupling between the pressure load cell 10 and the component carrier 8 is hereby optimised such that icing is reliably prevented. The thermal seal 52, i.e. the thermal coupling element, bounds a central region of the component carrier 8 that is provided with pressure tappings 56, such that the pressure tappings 56 are connected with the static pressure load cell 10. Alternatively or additionally a thermally conducting paste can be used as a thermal coupling element.

Figure 2:
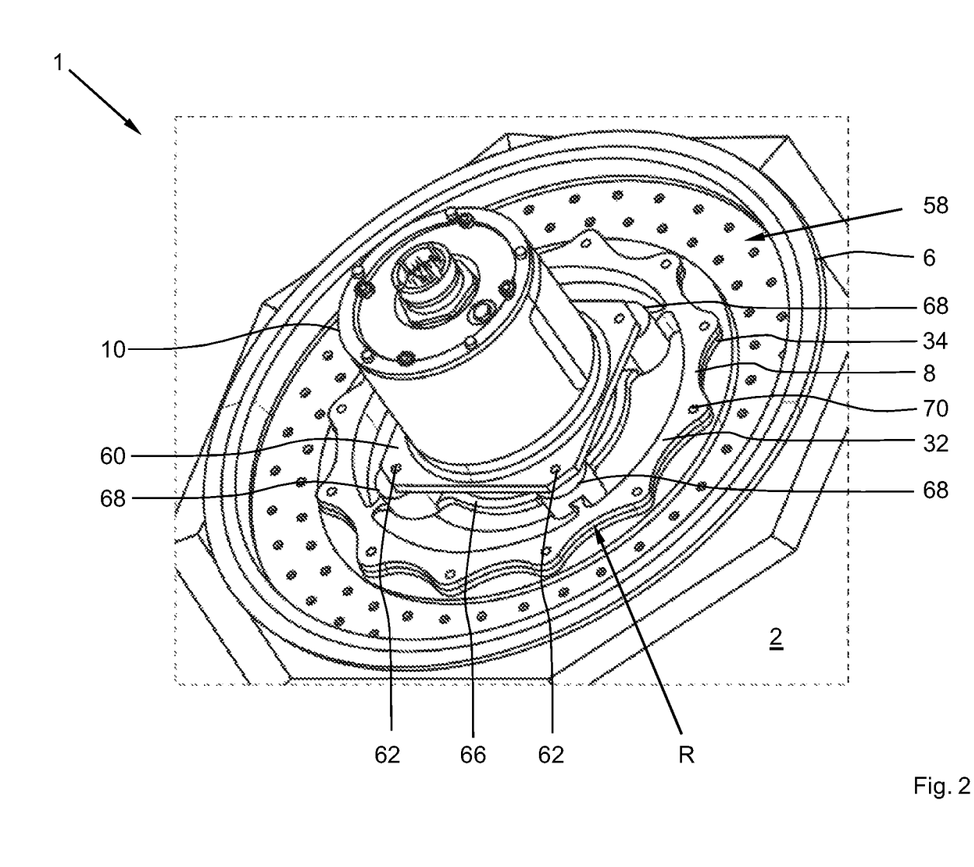
FIG. 2 shows a three-dimensional representation of the component arrangement in FIG. 1.

As can be seen in particular in FIG. 2, which shows a three-dimensional representation of the component arrangement 1 in FIG. 1, the mounting structure 6 is riveted to the fuselage structure 2 in a ring-shaped mounting region 58. The component carrier 8, embodied as an aerodynamic plate, is bolted from the interior onto the mounting structure 6 that is provided as a doubler. For this purpose the static pressure load cell 10 has a mounting plate 60 with four holes 62 arranged in corner regions for the reception of mounting bolts, not represented. The component carrier 8 and the mounting structure 6 are designed as metal components made from a titanium alloy with small component tolerances. By virtue of the ability to produce such metal components very precisely, very small component tolerances are present, so that the component carrier 8 can be bolted via the mounting structure 6 with minimum variances into a recess 64 (see FIG. 1) of the aircraft skin, relative to the outer contour of the aircraft. By this means the quality of the aerodynamic flow is only affected to the minimum possible extent. Furthermore, a replacement of the aerodynamic plate 8 can be undertaken from the interior without much effort, while the aircraft is in service. The plate 8 does not require adjustment, which provides an enormous time advantage in the maintenance of the part, or its replacement. The overall result is that simple maintenance of the aerodynamic plate 8 is achieved.

The component carrier 8 is designed as a structural component and is provided with an approximately ring-shaped stiffening structure 66, to which are assigned four diametrically arranged mounting flanges 68 with approximately cylindrical cross-sections. Each of the mounting flanges 68 is provided with a threaded bore embodied as a blind hole, or as a blind bore for a threaded insert (not represented), for the reception of mounting bolts during the assembly of the pressure load cell 10. The component carrier 8 has an approximately L-shaped flange region, wherein the ring-shaped collar 32 can be connected with the mounting structure 6. The ring-shaped collar 32 is of a weight-optimised design in an approximate star shape with radii R, and is provided with through bores 70 arranged in radially outer-lying regions for the reception of mounting bolts. The flange 34 of the mounting structure 6 is of a corresponding weight-optimised design in an approximate star shape, and is provided with threaded bores 72, arranged in radially outer-lying regions, each of which is designed as a blind hole (see FIG. 1). In the flange region is arranged a sealing ring 76 that is assigned to an arm 74 of the flange region (see FIG. 1). In addition to its sealing action this seal 76 eases the centring of the component carrier 8 in the mounting structure 6. Compared with conventional solutions the laborious sealing process, using a sealant, etc. can be eliminated.

By virtue of the design of the component carrier 8, i.e. of the aerodynamic plate, as a stiffened structural component, a weight advantage can be achieved, compared with conventional solutions, since the aerodynamic plate 8 is no longer designed as just a flow-optimised panel, but as a load-bearing structure. The installation of the plate 8 from the interior, as represented, ensures that even in the event of a failure of all the bolted connections the plate is not lost, since as a result of the internal pressure it is loaded outwards, and even in the absence of internal pressure is still held in its position by the sealing ring 76. It is furthermore advantageous that the aerodynamic function of the surface of the plate 8 is fully uninterrupted by bolt heads. This enables a more exact flow measurement as a result of the completely plane surface, which also does not have any surface waviness as a result of tightening the bolts. The overall result is that an improved aerodynamic flow quality is enabled for the measurement system, with a high level of operational reliability and simplified maintenance.

Figure 3:
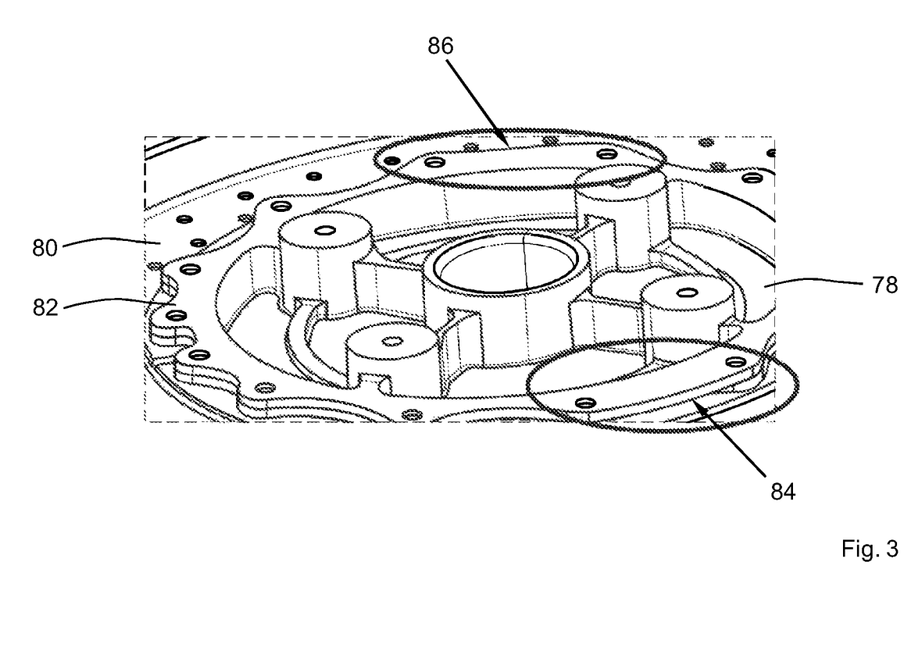
FIG. 3 shows a three-dimensional representation of a component arrangement in accordance a second example of embodiment of the invention.

On the basis of FIGS. 3 to 6 a second inventive example of embodiment is elucidated in what follows; this differs from the first example of embodiment in particular in terms of handling simplifications and in terms of a water drainage concept. As can be seen in FIG. 3, which shows a three-dimensional representation of a component arrangement, to improve the removal of a component carrier 78 from a mounting structure 80, a ring-shaped collar 82 of the component carrier 78 is designed on two approximately opposing sides without the radiussing between two bores, so that two handholds 84, 86 are provided.

Figure 4:
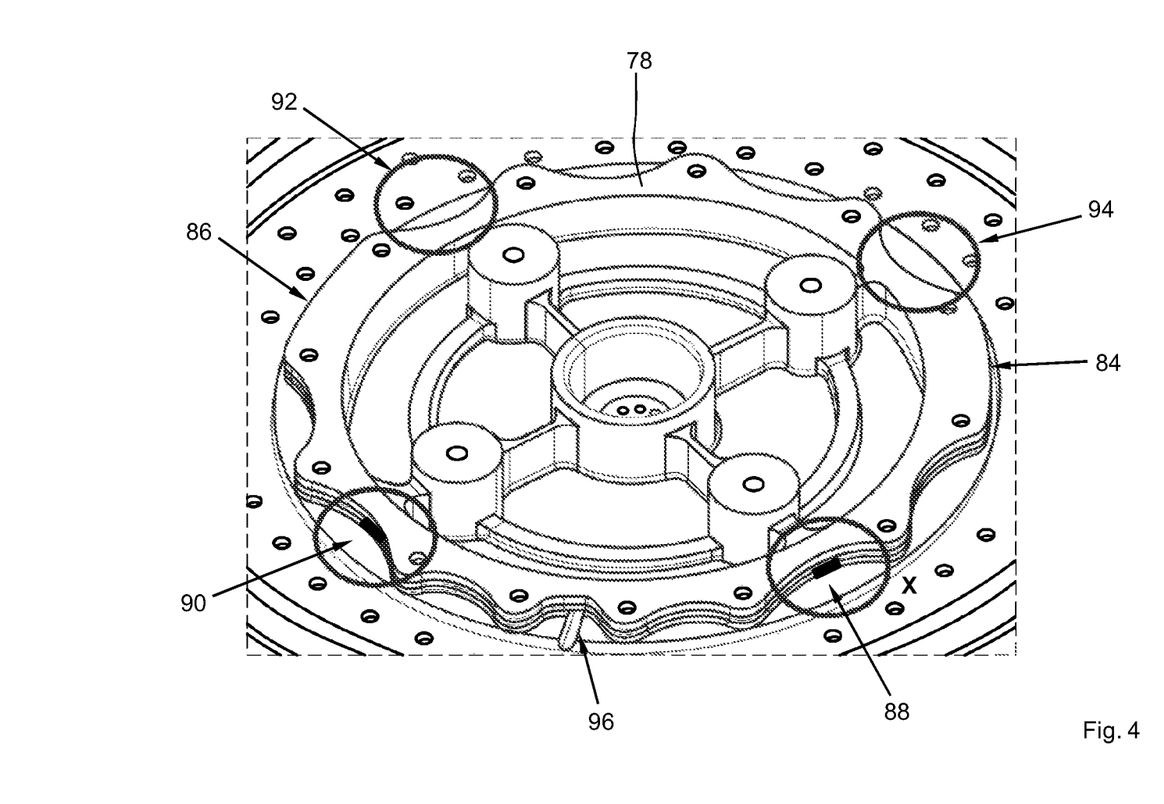
FIG. 4 shows a further three-dimensional representation of the component arrangement in FIG. 3.
Figure 5:
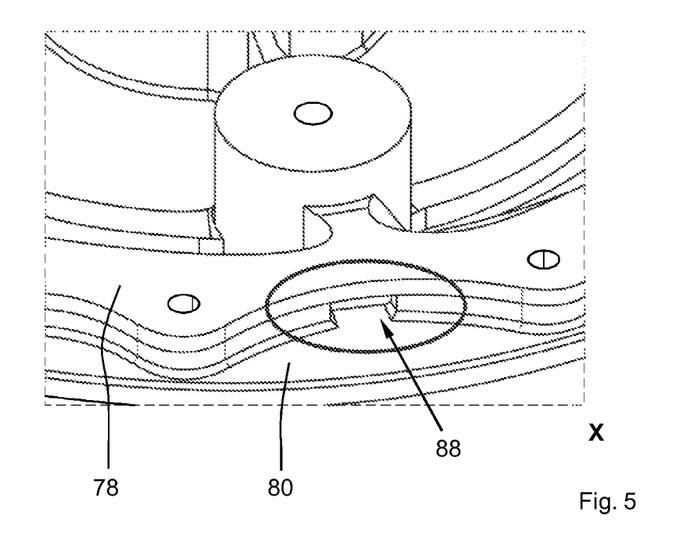
FIG. 5 shows a representation of a detail from FIG. 4.

In accordance with FIG. 4, which shows a further three-dimensional representation of the component arrangement in FIG. 3, alternatively or additionally leverage recesses, or leverage holes, 88 to 94 are provided in the mounting structure 80. In the example of embodiment represented four leverage recesses 88 to 94 are provided, diametrically arranged in the region of the mounting flanges. As can be seen in particular in FIG. 5, which shows a representation of a detail X from FIG. 4, the leverage recesses 88 to 94 have an approximately rectangular cross-section, and are designed such that a tool such as a screwdriver, for example, can be positioned between the component carrier 78 and the mounting structure 80. By means of a pivotal and/or rotational movement of the tool the component carrier 78 can be released from the mounting structure 80, by virtue of the leverage effect, with the application of only a small amount of force. This is in particular advantageous if the component carrier 78 after a long period in service is adhering strongly to the mounting structure 80, as a result of water and dirt, for example, and must be replaced, maintained or inspected. After its release by means of the tool, the component carrier 78 can be removed by means of the two handholds 84, 86.

Figure 6:
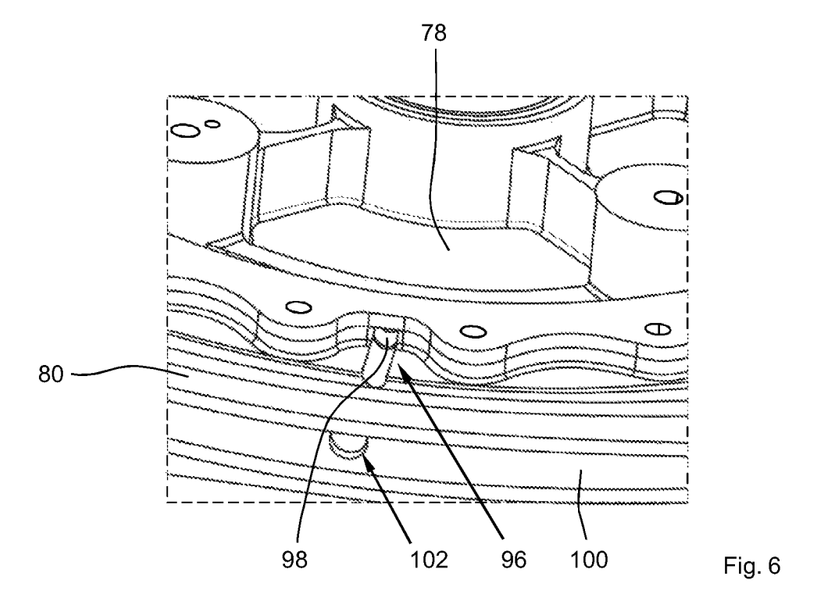
FIG. 6 shows a representation of a detail of the component arrangement in the region of a drainage channel.

In accordance with FIG. 4, the water drainage concept provides a drainage channel 96 in the mounting structure 80. As can be seen in FIG. 6, which shows a detailed representation of the component arrangement in the region of the drainage channel 96, a drainage recess 98 is designed in the region under the component carrier 78, and a through bore 102 is designed in the mounting structure 80 in the region of an arm 100 of the stiffening rim of the mounting structure 80. By this means water that has collected under the component carrier 78 can escape outwards through the drainage recess 98, the drainage channel 96 and the through hole 102, so that any damage caused by corrosion can be prevented, or at least greatly minimised. The pattern of bores, and also the actual contours of the component carrier 78 and the mounting structure 80, are of irregular design, so as to achieve unambiguous positioning without the possibility of error. In particular the distance between bores is reduced in the region of the drainage arrangement.

Disclosed is a component arrangement 1 on an aircraft structure 2, in particular on a fuselage structure of an aircraft 4, with at least one mounting structure 6, 80 connected with the aircraft structure 2, and at least one component 10 to be assigned to the aircraft structure 2, in particular a measuring device. In accordance with the invention at least one component carrier 8, 78 is provided for the reception of the component 10 to be mounted, wherein the component carrier 8, 78 can be connected with the mounting structure 6, and an outer surface 24 of the component carrier 8, 78, facing away from the component, extends approximately flush with an outer surface 16 of the aircraft structure 2. Also disclosed is a method for the installation of a component 10 into an aircraft structure 2 with a mounting structure 6, 80, wherein the component 10 is connected with the mounting structure 6 via a component carrier 8, 78, and an outer surface 24 of the component carrier 8, 78, facing away from the component 10, extends approximately flush with an outer surface 16 of the aircraft structure 2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A component arrangement on an aircraft structure, comprising:
   at least one mounting structure connected with the aircraft structure,
   at least one component configured to be mounted to the aircraft structure, and
   at least one component carrier for the reception of the component to be mounted,
   wherein the component carrier is configured as a one-piece aerodynamic plate and wherein the installation of the component takes place directly on the aerodynamic plate,
   the component carrier being connected with the mounting structure, wherein the component carrier is inserted into a central receptacle of the round, approximately ring-shaped mounting structure from an inner side of the aircraft, wherein a supporting surface of a ring-shaped collar of the component carrier abuts against a seating face of a flange of the mounting structure, wherein the supporting surface is facing away from the inner side of the aircraft and the seating face is facing towards the inner side of the aircraft and
   an outer surface of the component carrier, facing away from the component, extending approximately flush with an outer surface of the aircraft structure.

2. The component arrangement according to claim 1, wherein said aircraft structure comprises a fuselage structure of an aircraft.

3. The component arrangement according to claim 1, wherein said component comprises a measuring device.

4. The component arrangement in accordance with claim 1, wherein the mounting structure is connected with an inner surface of the aircraft structure.

5. The component arrangement in accordance with claim 1, wherein the component carrier has a receiving section for the reception of a projection of the component to be mounted.

6. The component arrangement in accordance with claim 5, wherein the receiving section has an abutment face, facing towards the component, which can be brought into abutment against a flange face of the component.

7. The component arrangement in accordance with claim 6, wherein at least one seal is arranged in a ring shaped groove of the abutment face.

8. The component arrangement in accordance with claim 7, wherein said at least one seal comprises a sealing ring.

9. The component arrangement in accordance with claim 5, wherein an end face of the projection of the component, via at least one thermally effective seal which thermally couples the component and the component carrier, abuts against a contact face of the component carrier.

10. The component arrangement in accordance with claim 1, wherein a mounting web of the component carrier is approximately cup-shaped in design and the mounting structure is approximately ring-shaped, the component carrier being inserted in the mounting structure.

11. The component arrangement in accordance with claim 1, wherein a supporting surface of the component carrier abuts against a seating face of the mounting structure.

12. The component arrangement in accordance with claim 1, wherein the component carrier has an approximately L-shaped flange region with a ring-shaped collar, which is connected with the mounting structure.

13. The component arrangement in accordance with claim 1, wherein the at least one component is a pressure measuring device.

14. The component arrangement in accordance with claim 13, wherein the pressure measuring device is a static pressure load cell.

15. A method for the installation of a component into an aircraft structure, comprising the steps:
  mounting a mounting structure on the aircraft structure,
  connecting the component with the mounting structure via a component carrier, wherein the component carrier is designed as a one-piece aerodynamic plate and wherein the installation of the component takes place directly on the aerodynamic plate,
  with an outer surface of the component carrier, facing away from the component, extending approximately flush with an outer surface of the aircraft structure, wherein the component carrier is inserted into a central receptacle of the round, approximately ring-shaped mounting structure from an inner side of the aircraft, wherein a supporting surface of a ring-shaped collar of the component carrier abuts against a seating face of a flange of the mounting structure, wherein the supporting surface is facing away from the inner side of the aircraft and the seating face is facing towards the inner side of the aircraft.

16. The method according to claim 15, wherein the component is a measuring device on a fuselage structure of an aircraft.

17. The method in accordance with claim 15, including the further step of connecting the mounting structure with the aircraft structure such that a seating face for the component carrier has a defined clearance from the outer surface of the aircraft structure.

\* \* \* \* \*